(12) United States Patent
Yu (10) Patent No.: US 10,330,359 B2
(45) Date of Patent: Jun. 25, 2019

(54) ROTARY FOUR-WAY REVERSING VALVE WITH LOW PRESSURE DROP AND LOW LEAKAGE

(71) Applicant: SHANGHAI GOLDAIR ELECTRIC SYSTEM CO., LTD., Shanghai (CN)

(72) Inventor: Shijun Yu, Shanghai (CN)

(73) Assignee: SHANGHAI GOLDAIR ELECTRIC SYSTEM CO., LTD., Shanghai (CN)

( * ) Notice: Subject to any disclaimer, the term of this patent is extended or adjusted under 35 U.S.C. 154(b) by 0 days.

(21) Appl. No.: 15/110,736

(22) PCT Filed: Jan. 29, 2014

(86) PCT No.: PCT/CN2014/071745
§ 371 (c)(1),
(2) Date: Jul. 9, 2016

(87) PCT Pub. No.: WO2015/113242
PCT Pub. Date: Aug. 6, 2015

(65) Prior Publication Data
US 2016/0334151 A1    Nov. 17, 2016

(51) Int. Cl.
*F16K 31/00* (2006.01)
*F25B 41/04* (2006.01)
(Continued)

(52) U.S. Cl.
CPC .......... *F25B 41/046* (2013.01); *F16K 5/0478* (2013.01); *F16K 11/0856* (2013.01);
(Continued)

(58) Field of Classification Search
CPC .................. F25B 41/046; F25B 13/00; F25B 2313/02741; F16K 11/0856;
(Continued)

(56) References Cited

U.S. PATENT DOCUMENTS 2,540,229 A * 2/1951 Alessandro ............... F01L 7/00
137/625.29
2,933,107 A * 4/1960 Wiegers ................ F16K 11/065
137/625.29

(Continued)

*Primary Examiner* — Matthew W Jellett
*Assistant Examiner* — Christopher D Ballman
(74) *Attorney, Agent, or Firm* — Houtteman Law LLC (57) ABSTRACT

The invention provides a rotary four-way reversing valve with low pressure drop and low leakage, comprising a valve body and a valve core arranged in the valve body through bearings. The valve body comprises a low-pressure exhaust tube, a high-pressure air inlet tube, a condenser tube and an evaporating tube. The valve core is slantingly divided by a U-shaped seal ring with a spring into a high-pressure chamber and a low-pressure chamber that are not communicated with each other. The valve core comprises a through hole arranged in the high-pressure chamber and aligned with the high-pressure air inlet tube of the valve body and an opening aligned with the condenser tube or the evaporating tube, an opening arranged in the low-pressure chamber and always aligned with the low-pressure exhaust tube and an opening aligned with the condenser tube or the evaporating tube.

10 Claims, 8 Drawing Sheets

(51) Int. Cl.
*F16K 31/163* (2006.01)
*F16K 5/04* (2006.01)
*F16K 11/085* (2006.01)
*F16K 31/04* (2006.01)
*F25B 13/00* (2006.01)
*F16K 11/052* (2006.01)

(52) U.S. Cl.
CPC ........ *F16K 31/047* (2013.01); *F16K 31/1635* (2013.01); *F25B 13/00* (2013.01); *F16K 11/0525* (2013.01); *F25B 2313/02741* (2013.01); *Y10T 137/2678* (2015.04); *Y10T 137/86839* (2015.04)

(58) Field of Classification Search
CPC ............... F16K 31/1635; F16K 5/0478; F16K 11/0525; Y10T 137/86839; Y10T 137/2678
See application file for complete search history.

(56) References Cited

U.S. PATENT DOCUMENTS

| | | | | |
|---|---|---|---|---|
| 3,362,433 A * | 1/1968 | Heinen | ............... | F16K 11/0833 137/625.42 |
| 3,802,457 A * | 4/1974 | Wurzburger | .......... | F16K 5/0407 137/327 |
| 4,044,789 A * | 8/1977 | Elmore | ............... | F16K 11/0833 137/367 |
| 4,255,939 A * | 3/1981 | Ou | ........................ | F25B 41/046 137/625.29 |
| 4,361,170 A * | 11/1982 | Peloza | ............... | B60H 1/00485 137/625.29 |
| 4,385,746 A * | 5/1983 | Tomlin | ...................... | F16K 5/16 137/625.43 |
| 4,492,252 A * | 1/1985 | Kanai | ................... | F25B 41/046 137/625.43 |
| 5,037,281 A * | 8/1991 | Lane | ..................... | F04C 27/005 277/399 |
| 6,024,038 A * | 2/2000 | Kiliz | ..................... | B63H 25/46 114/151 |
| 6,152,178 A * | 11/2000 | Hirota | ................... | F16K 11/048 137/625.43 |
| 6,155,296 A * | 12/2000 | Roman | ............. | B60H 1/00485 137/625.29 |
| 6,289,931 B1 * | 9/2001 | Sisk | .................... | F16K 11/0853 137/625.43 |
| 6,308,739 B1 * | 10/2001 | Barbuto | ................ | F16K 5/0478 137/625.11 |
| 6,491,063 B1 * | 12/2002 | Benatav | ................ | F25B 41/046 137/625.43 |
| 6,830,073 B2 * | 12/2004 | Lee | ..................... | F15B 13/0406 137/625.43 |
| 6,959,730 B2 * | 11/2005 | Margiott | ............. | F16K 11/0525 137/625.43 |
| 6,983,760 B2 * | 1/2006 | Lee | ..................... | F15B 13/0406 137/375 |
| 8,397,757 B2 * | 3/2013 | Kannoo | ................ | F16K 11/074 137/625.43 |
| 8,505,580 B2 * | 8/2013 | Ary | .................... | F16K 11/0856 137/625.43 |
| 8,568,346 B2 * | 10/2013 | Sternby | ................ | A61M 1/3653 604/4.01 |
| 8,763,640 B2 * | 7/2014 | Kojima | ................. | F16K 11/074 137/625.23 |
| 8,979,068 B2 * | 3/2015 | Yeary | .................... | F16K 5/0678 251/172 |
| 9,074,522 B2 * | 7/2015 | Scholt | ................... | F02B 33/00 |
| 9,194,102 B2 * | 11/2015 | Buckner | .................. | E02F 3/90 |
| 2003/0024239 A1 * | 2/2003 | Massey | ................. | F15B 15/065 60/406 |
| 2013/0247604 A1 * | 9/2013 | Giles | ................... | F16K 11/0525 62/238.7 |

* cited by examiner

ROTARY FOUR-WAY REVERSING VALVE WITH LOW PRESSURE DROP AND LOW LEAKAGE

FIELD OF THE INVENTION

The invention relates to a four-way reversing valve used for a heat pump type refrigerating system to control flow direction of refrigerants.

DESCRIPTION OF THE RELATED ART

A heat pump refrigerating unit comprises a our-way reversing valve switches between the refrigerating mode and heating mode of a refrigerating system by changing the flow direction of refrigerants. The four-way reversing valve has a high-pressure channel and a low-pressure channel that are mutually isolated. As there is a large pressure difference between the two channels, it is required to reduce the pressure loss, heat loss and leakage between the two channels of the four-way reversing valve in order for the heat pump type refrigerating system to have a high energy efficiency ratio. Although it is inevitable to produce metal filings, welding slag and other small particles in the system during fabrication and operation of the heat pump unit, these small particles cannot affect the reversing switching of the four-way reversing valve. In a nutshell, an ideal four-way reversing valve is expected to have the following advantages at the same time:

Firstly, when refrigerants pass through the high-pressure and low-pressure channels of the four-way reversing valve at rated flow, low pressure loss will occur especially in the low-pressure channel.

Secondly, the heat transfer between the high-pressure part and the low-pressure part should be as small as possible.

Thirdly, a reliable seal must be established between the high-pressure and low-pressure channels to minimize the leakage of refrigerants.

Fourthly, shortage of lubricating oil or possible existence of metal filings and welding slag in the system will not affect normal reversing of the four-way reversing valve.

Fifthly, in order to ensure successful reversing, the (middle flow) when the reversing process is at (middle state) should not be too large.

Figure 1:
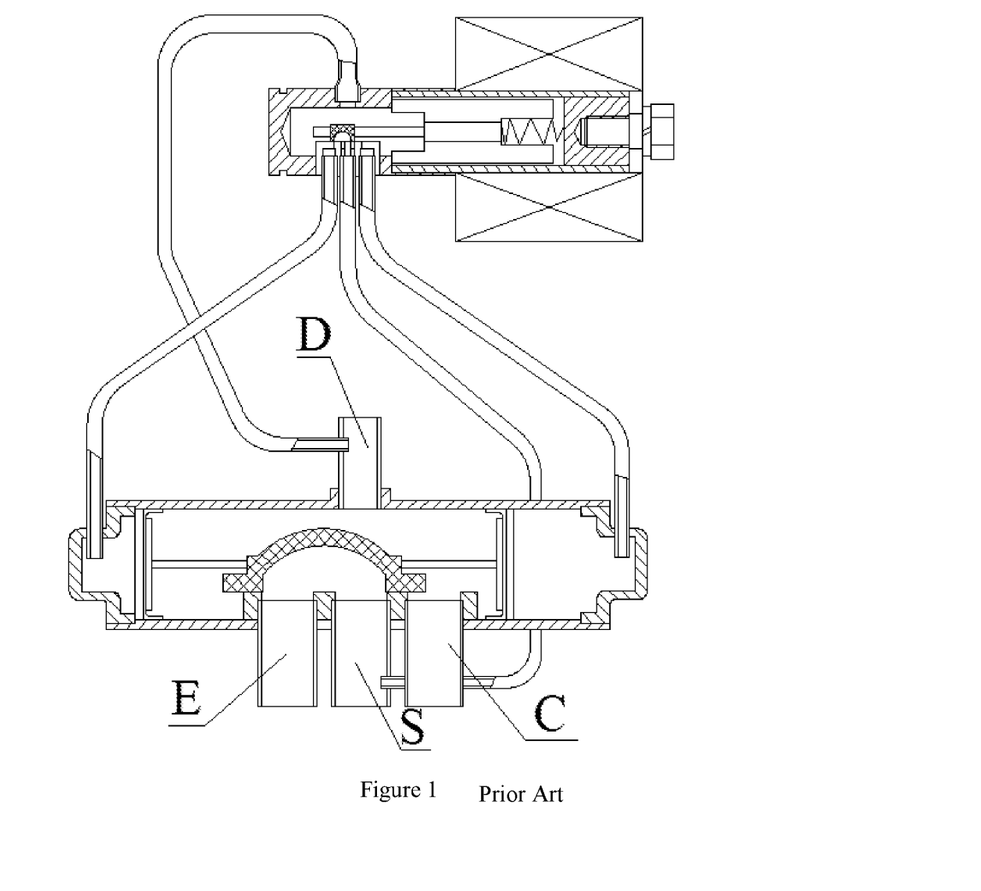
FIG. 1 is a structural schematic diagram of an existing four-way reversing valve.

A common four-way reversing valve that has a small capacity and is used for heat pump air conditioner is shown in FIG. 1. The low-pressure channel of the valve makes a 180° turn from an evaporating tube E to a low-pressure exhaust tube S. The general low-pressure loss is more than 1.7 psi (11.7 kPa), and the internal leakage is large. For example, the internal leakage at rated capacity of 60 tons of refrigeration is 15 l/min. The four-way reversing valve with such structure can only withstand a capacity of 120 tons of refrigeration generally. A total volume of more than 120 tons of refrigeration requires more than two single valves connected in parallel, which results in higher pressure loss. However, low-pressure loss has a large effect on the refrigeration performance of the unit. For example, the pressure of the four-way reversing valve with rated capacity of 5 tons of refrigeration (18 kw) falls by 2 Psi (13.8 kPa). If the low pressure falls by 0.8 psi (5.5 kPa), heat output of about 1.2 kw is gained without adding input power. Therefore, the four-way reversing valve is unfavorable for low carbon and energy saving of the air conditioning system.

Figure 2:
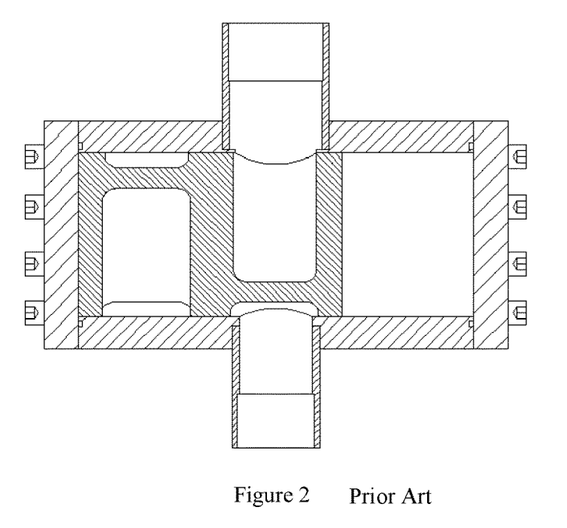
FIG. 2 is a sectional view of an existing four-way reversing valve with another structure.
Figure 3:
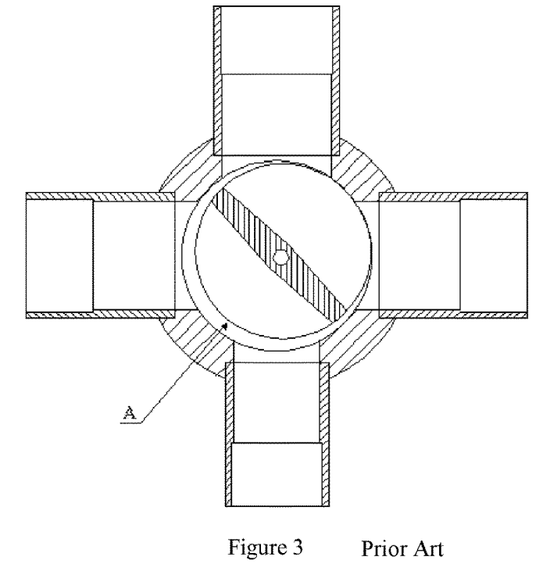
FIG. 3 is a sectional view of an existing four-way reversing valve with another structure in another direction.

Another common four-way reversing valve is shown in FIG. 2 and FIG. 3. The general capacity of the four-way reversing valve is large; high-pressure and low-pressure channels are isolated by a fine fit between piston and valve, and reversing is performed through piston movement. In actual application, the line of a heat pump unit will be provided with a filter that can only filter impurities of particles larger than 0.2 mm. It is unavoidable to produce metal filings, welding slag and other small particle impurities with diameter less than 0.2 mm during manufacturing, assembly and operation of the compressor. The four-way reversing valve with structure above is of fine fit between the cylindrical piston and valve body with a fit clearance of 0.005-0.02 mm. Under the action of high-pressure fluid, the piston is crushed to the low-pressure side to produce a clearance A that will result in severe internal leakage. At the low-pressure side, the piston and valve body will bear very large lateral pressure which will cause a great friction during piston movement.

When there is a shortage in oil and the friction is unlubricated or small particle impurities enter the clearance between the piston and valve body (also seal surface), the piston will be locked, resulting in reversing failure.

In order to improve the situations above, professionals have worked out many solutions For example, the patent application No. 201010536012.8 entitled HIGH-CAPACITY FOUR-WAY REVERSING VALVE uses such means that oil inlet and outlet are arranged on the valve body, and lubricating oil line is arranged on the piston to establish an oil film on the seal surface, thus preventing the piston from being locked due to oil starvation and unlubricated friction during reversing. The patent application No. 201110100691.9 entitled PISTON TYPE FOUR-WAY REVERSING VALVE uses the means of fixing a solid lubricating spacer in the valve body, so that piston can slide and reverse in case of oil starvation without being locked. However, the two patents do not solve the problem that piston's reversing fails as piston is locked by small particle impurities, and do not solve the problem of large internal leakage due to the clearance between hard seals.

The patent application No. 200810125554.9 entitled FOUR-WAY REVERSING VALVE discloses a four-way reversing valve using piston rotation. The patent is nothing new except replacement of piston rotation with movement for reversing, and its defect is similar to that of the four-way reversing valve as shown in FIG. 2.

The patent application No. 201110022586.8 entitled A HARD SEAL PLUG VALVE discloses a floating cone plug valve. The invention uses the cone seal technology and reverses when the cone cock is floating, which effectively solves the internal seal and reliable reversing problems. However, the invention uses motor as drive force for reversing heat pump air conditioners. Such structure is complicated accordingly and has high manufacturing cost. General application with capacity more than 80 tons of refrigeration has advantages, but has no cost advantage when the refrigeration capacity is less than 80 tons.

SUMMARY OF THE INVENTION

The purpose of the invention is to provide a rotary four-way reversing valve with low pressure drop and low leakage and capable of ensuring effective reversing.

In order to achieve the purpose above, the technical solution of the invention is to provide a rotary four-way reversing valve with low pressure drop and low leakage, comprising a valve body and a (valve core assembly) capable of switching between a first stop position and a second stop position in the valve body by rotation. A high-pressure air inlet tube, an evaporating tube, a condenser tube and a low-pressure exhaust tube communicated with the valve body are arranged on the valve body. The invention is characterized in that the valve core assembly is coaxially assembled in the valve body through bearings. A gap is formed between the outer circumference of the valve core assembly and the inner wall of the valve body. A circle of seal structure is arranged on the outer circumference of the valve core assembly, and the outermost edge of the seal structure is in tight fit with the inner wall of the valve body. The space formed by the valve body and the valve core assembly is divided by the seal structure into a high pressure chamber and a low pressure chamber that are mutually independent.

When the valve core assembly is rotated to the first stop position, the high-pressure air inlet tube is communicated with the condenser tube only through the high-pressure chamber, and the evaporating tube is communicated with the low-pressure exhaust tube only through the low-pressure chamber.

When the valve core assembly is rotated to the second stop position, the high-pressure air inlet tube is communicated with the evaporating tube only through the high-pressure chamber, and the condenser tube is communicated with the low-pressure exhaust tube only through the low-pressure chamber.

Preferably, the valve core assembly comprises a first valve core. The first valve core is provided with a through first opening aligned with the high-pressure air inlet tube, a second opening aligned with the condenser tube at the first stop position and aligned with the evaporating tube at the second stop position, a third opening aligned with the evaporating tube at the first stop position and aligned with the condenser tube at the second stop position, and a fourth opening aligned with the low-pressure exhaust tube.

The through first opening is communicated with the second opening only through a first channel formed in the first valve core, and the third opening is communicated with the fourth opening only through a second channel formed in the first valve core.

The first channel and the second channel are independent of each other, and the second channel is an arc-shaped channel bent by 80-100°.

Alternatively, the valve core assembly comprises a second valve core, a first oblique baffle is arranged on the second valve core, and the seal structure is arranged on the outer circumference of the oblique baffle.

Preferably, the valve core assembly is coaxially assembled in the valve body through a first bearing for bearing radial force and a second bearing for bearing radial force and axial force, and the two bearings are located at both ends of the valve core assembly.

Preferably, the seal structure comprises a seal ring with a seal lip that is tightly sheathed on the valve core assembly, the lip opening of the seal ring faces toward the high-pressure chamber, and the outmost edge of the lip of the seal ring is in tight fit with the inner wall of the valve body.

Preferably, the seal ring is a U shape with a seal lip and is embedded with a spring therein. The spring is also a U-shaped toothed spring in fit with the interior of the seal ring. Alternatively, the seal ring is in an L shape with a seal lip. Alternatively, the spring embedded in the seal ring is a spiral cylindrical spring.

Preferably, the seal ring is positioned and fixed on the valve core assembly through a positioning fixture.

Preferably, the positioning fixture has a circle of projection close to the outer edge of the seal ring end, and the projection sheathes the seal lip of the seal ring to protect the seal ring against tearing by high-pressure airflow during reversing.

Preferably, the seal ring is made from Freon-resistant and heat-and-cold-resistant elastic materials.

Preferably, the valve core assembly is driven by a drive assembly to rotate by about 180°.

Preferably, the drive assembly is a motor drive assembly or comprises a solenoid pilot valve that drives the valve core assembly to rotate through a rack and pinion mechanism.

The four-way reversing valve provided by the invention has the following characteristics:

Firstly, the low-pressure flow channel can be considered as an isometric 90° bend and the high-pressure flow channel is similar to a 90° bend. Compared with the existing four-way reversing valve, more than 70% of low-pressure loss can be reduced, thus pressure loss is especially small.

Secondly, a Freon-resistant and heat-and-cold-resistant PTEF U-shape seal ring with a spring is used as the seal between the high pressure part and low pressure part. The elastic fore of the seal ring itself and the spring provide initial sealing specific pressure and play the role of sealing when there is a small difference between the high and low pressure. When there is a large difference in pressure, sealing pressure on the valve body in the U-shape seal ring increases proportionally because of high pressure gas, thus reliable seal can be automatically compensated at high temperature and high differential pressure, and internal leakage can be reduced by more than 98%, so that internal leakage is almost zero.

Thirdly, with the exception of the parts in contact with seal ring, the remaining parts of the valve core and valve body has a 0.3-2 mm clearance. The valve core and valve body are connected through rolling bearings. The small axial lateral pressure from the difference between high pressure and low pressure of the system on the valve core is undertaken by the rolling bearings. The valve core can be rotated only by overcoming the sliding friction force of the seal ring on the valve body and extremely small rolling friction force of the bearings. The preferred U-shape seal ring material of the invention contains a large proportion of PTEF component and has a very small friction coefficient, even in the case of oil absence—the friction force of the rolling bearings can be ignored. Therefore, the friction force of the U-shape seal ring of the invention on the valve body is far less than that caused by direct contact between the piston and valve body of the four-way reversing valve. For example, when the four-way reversing valve with 120 tons of refrigeration (420 kW) has a pressure difference of 1 MPa, the existing four-way reversing valve probably requires piston thrust of 2700 N-4000 N. However, the piston of the four-way reversing valve with the same capacity provided by the invention can be reversed only with 700N piston thrust, the torque required by reversing is small, and reversing is reliable.

Fourthly, in addition to the sealing function, the U-shape seal ring fixed on the valve core can be used to scrub the seal surface at the inner wall of valve body, thus small metal filings, welding slag and other impurities in the system will not affect the sealing and reversing of the valve.

Fifthly, when the valve core is rotated by 90° to the middle position during reversing, the first and second openings of the high-pressure chamber part of the valve core and the third opening of the low-pressure chamber part are completely covered by the valve body. There is only small clearance between the outer circle of the valve core and the inner circle of the valve body for high-pressure and low-pressure gas to bypass, thus avoiding air suffocation during reversing of the air conditioning system from causing abnormal high-pressure failure. However, the bypass flow (also called as middle flow) is very small, thus a solenoid pilot valve can be used for direct drive, or the solenoid pilot is started firstly and reversing is automatically finished when difference between high-pressure and low-pressure is established upon operation of the compressor, thus the reversing reliability of the valve is extremely high. However, when the existing four-way reversing valve has a refrigeration capacity? Of more than 40 tons, a small four-way reversing valve must be driven by a solenoid pilot valve, and then a main valve is driven by the small four-way reversing valve. Furthermore, reversing operation is required only when flow is more than 50% rated flow.

Sixthly, the invention applies to the four-way reversing valves with capacity more than 5 tons of refrigeration. Compared with the existing four-way reversing valves with the same capacity, the four-way reversing valve of the invention has small outline dimension and simple structure. For example, the main valve of the existing four-way reversing valve with cold capacity of 120 tons of refrigeration (420 kW) has a diameter of about more than 130 mm. The main valve of the invention is slightly short but has a diameter of about 100 mm. Therefore, the invention has a cost advantage in addition to the obvious breakthrough in performance.

DESCRIPTION OF THE PREFERRED EMBODIMENTS

The invention is described in detail in combination with the following drawings and preferred embodiments for clear understanding.

Example 1

Figure 4:
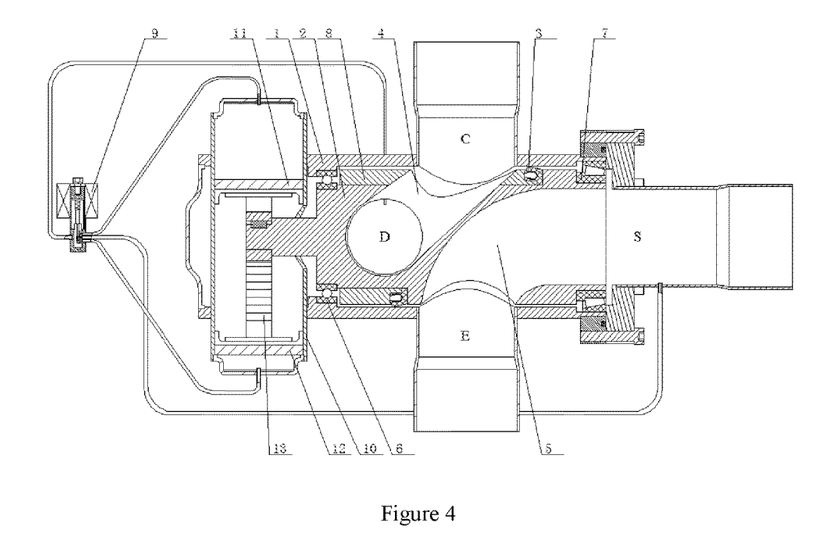
FIG. 4 is a schematic diagram of the rotary four-way reversing valve with low pressure drop and low leakage located at first stop position in example 1.
Figure 5:
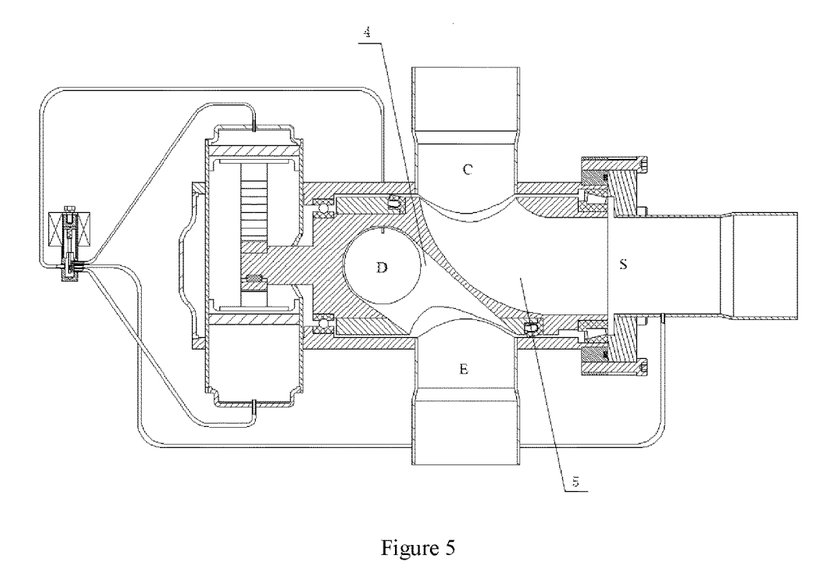
FIG. 5 is a schematic diagram of the rotary four-way reversing valve with low pressure drop and low leakage located at second stop position in example 1.
Figure 10:
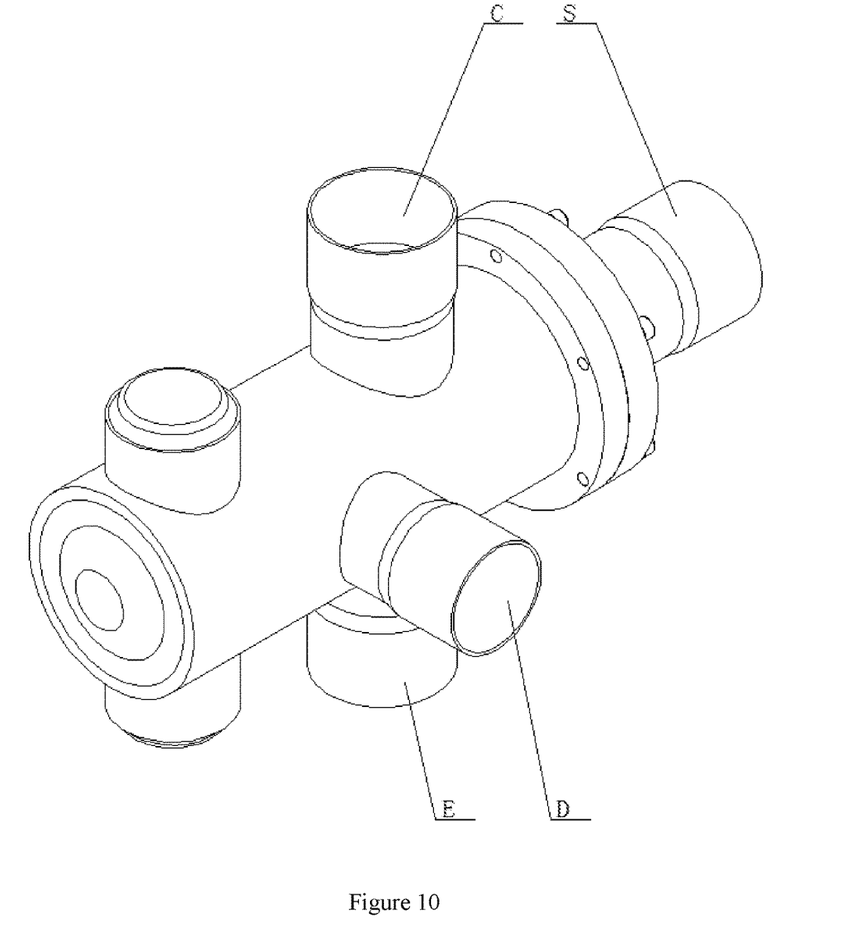
FIG. 10 is an appearance diagram of the rotary four-way reversing valve with low pressure drop and low leakage in example 1.

As shown in FIG. 4 and FIG. 5, a rotary four-way reversing valve with low pressure drop and low leakage disclosed by the example comprises a valve body 1 on which a high-pressure air inlet tube D, an evaporating tube E, a condenser tube C and a low-pressure exhaust tube S that are communicated with the valve body 1 are arranged. In this example (in combination of FIG. 10), the condenser tube C and evaporating tube E are located at the middle of the valve body 1 and are symmetrically arranged. The low-pressure exhaust tube S is located at the right end of the valve body 1. The axis of the valve body 1 is in the same plane as that of the condenser tube C, evaporating tube E and low-pressure exhaust tube S, and the axis of the high-pressure air inlet tube D located at the left end of the valve body 1 is perpendicular to the plane.

The valve core assembly 2 is coaxially assembled in the valve body 1 through a first bearing 6 and a second bearing 7. The first bearing 6 is used for bearing the radial force of the valve core, while the second bearing 7 is used for bearing the radial force and axial force of the valve core. The valve core assembly 2 is driven by the drive assembly to switch between the first stop position and second stop position by rotation. A circle of seal structure 3 is arranged on the outer circumference of the valve core assembly 2, and the outermost edge of the seal structure 3 is in tight fit with the inner wall of the valve body 1. The space formed by the valve body 1 and the valve core assembly 2 is divided by the seal structure 3 into a high pressure chamber 4 and a low pressure chamber 5 that are mutually independent. Except the first bearing 6, second bearing 7 and a part in contact with the valve body 1 through the seal structure 3, the remaining parts of the valve core assembly 2 have a clearance of 0.3-2 mm.

Figure 6:
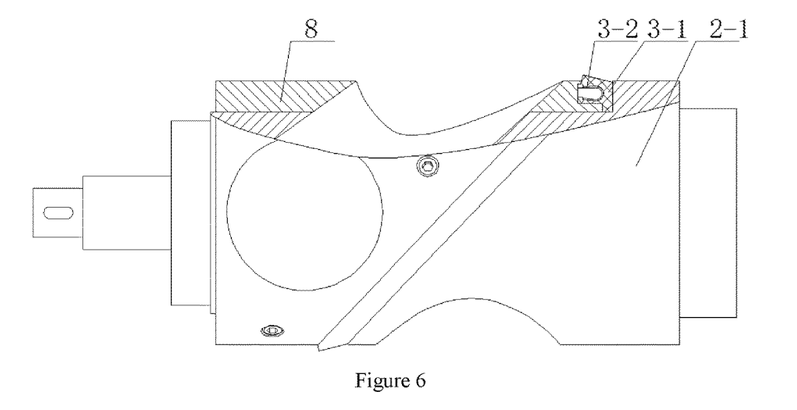
FIG. 6 is a schematic diagram of the valve core assembly and seal structure in example 1.

The valve core assembly 2 can be of various structures. In this example (in combination of FIG. 6), the valve core assembly 2 comprises a first valve core 2-1. The first valve core 2-1 is provided with a through first opening aligned with the high-pressure air inlet tube D ("alignment" means that first opening is aligned with a corresponding port of the high-pressure air inlet tube D and is completely covered by such port, the same below), a second opening aligned with the condenser tube C at the first stop position and aligned with the evaporating tube E at the second stop position, a third opening aligned with the evaporating tube E at the first stop position and aligned with the condenser tube C at the second stop position, and a fourth opening aligned with the low-pressure exhaust tube S. The first opening is communicated with the second opening only through a first channel formed in the first valve core 2-1, and the third opening is communicated with the fourth opening only through a second channel formed in the first valve core 2-1. The first channel and the second channel are independent of each other. The first channel is an oblique channel, while the second channel is an arc-shaped channel bent by 90°.

As shown in FIG. 4, when the valve core assembly 2 is rotated to the first stop position, the high-pressure air inlet tube D is communicated with the condenser tube C only through the high-pressure chamber 4, and the evaporating tube E is communicated with the low-pressure exhaust tube S only through the low-pressure chamber 5. As shown in FIG. 5, when the valve core assembly 2 is rotated to the second stop position, the high-pressure air inlet tube D is communicated with the evaporating tube E only through the high-pressure chamber 4, and the condenser tube C is communicated with the low-pressure exhaust tube S only through the low-pressure chamber 5.

Figure 7:
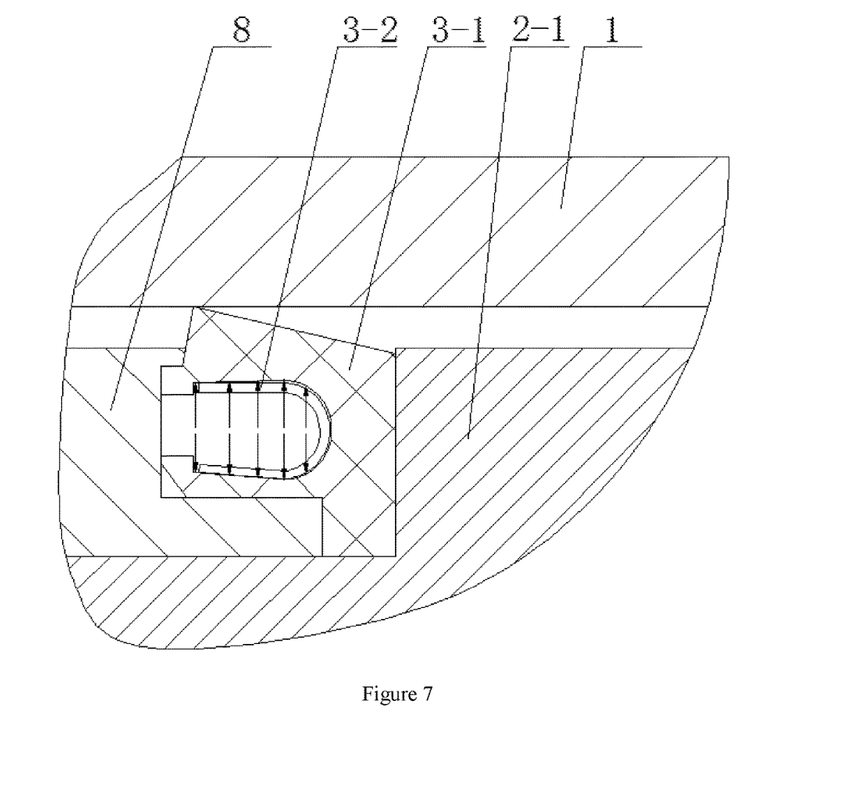
FIG. 7 is a schematic diagram of the seal structure in example 1.
Figure 8:
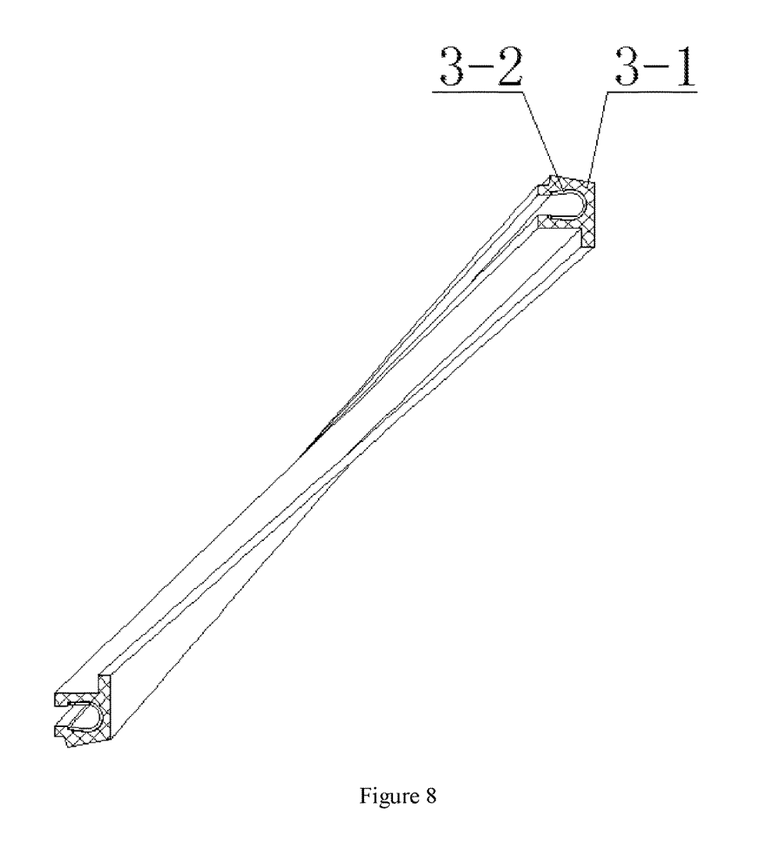
FIG. 8 is a stereogram of the seal structure in example 1.
Figure 9:
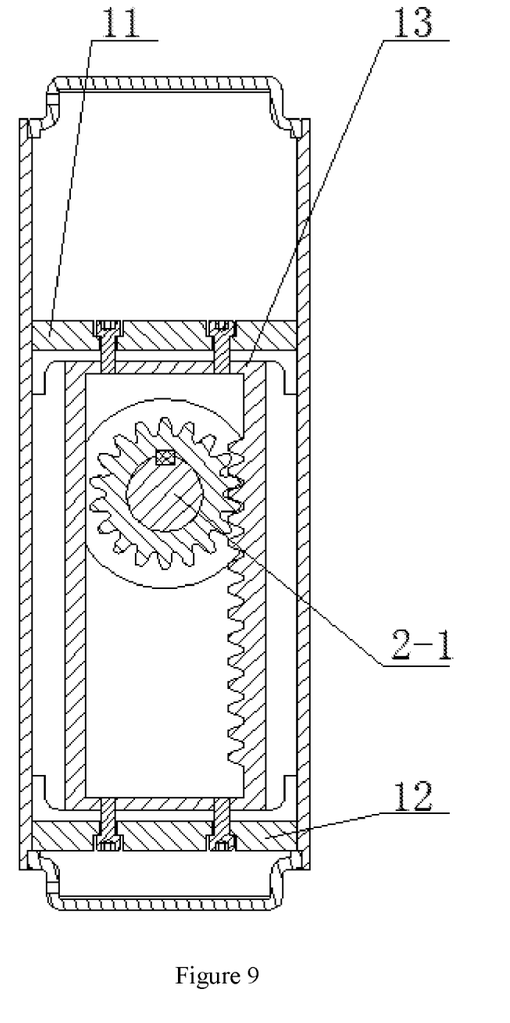
FIG. 9 is a schematic diagram of the drive assembly structure consisting of pinions and racks.

In this example (in combination with FIG. 7 and FIG. 8), the seal structure 3 comprises a seal ring 3-1 positioned and fixed on the first valve core 2-1 through a positioning fixture 8, and the seal ring 3-1 is made from Freon-resistant and heat-and-cold-resistant elastic materials with opening toward the high-pressure chamber 4. A spring 3-2 is embedded in the seal ring 3-1, and a circle of projection is formed on the outer circumference of the seal ring 3-1 (the projection can be but not limited to obtuse projection with an obtuse angle at top), and only the outmost edge of the projection is in precision contact with the inner wall of the valve body 1 to form high pressure and low-pressure seal. As long as the outer edge of the seal ring 3-1 can meet the requirements of the invention, the shape thereof can have various changes, such as V shape and L shape.

In this example, the drive assembly for driving the valve core assembly 2 to rotate comprises a pilot valve 9 that drives the valve core assembly 2 to rotate through a rack and pinion mechanism. By combining FIG. 10, the working process of the example is as follows:

By combining FIG. 4, the pilot valve 9 loses power at this time, that is, when high voltage is applied to the upper part of a piston bush 10, low voltage is applied to the lower part thereof, and pistons 11 and 12 drive a rack 13 to move downward and move a pinion and the valve core assembly 2 to rotate to the first stop position, the high-pressure air inlet tube D is communicated with the condenser tube C only through the high-pressure chamber 4, and the evaporating tube E is communicated with the low-pressure exhaust tube S only through the low-pressure chamber 5. High-pressure air enters the first channel through the high-pressure air inlet tube D, and then comes out of the condenser tube C. Low-pressure air enters the second channel through the evaporating tube E and comes out of the low-pressure exhaust tube S. By combining FIG. 5, the pilot valve 9 loses power at this time, that is, when high voltage is applied to the lower part of a piston bush 10, low voltage is applied to the higher part thereof, and pistons 11 and 12 drive the rack 13 to move upward and move the pinion and the valve core assembly 2 to rotate to the second stop position, the high-pressure air inlet tube D is communicated with the evaporating tube E only through the high-pressure chamber 4, and the condenser tube C is communicated with the low-pressure exhaust tube S only through the low-pressure chamber 5. High-pressure air enters the first channel through the high-pressure air inlet tube D, and then comes out of the evaporating tube E. Low-pressure air enters the second channel through the condenser tube C and comes out of the low-pressure exhaust tube S.

Example 2

Figure 11:
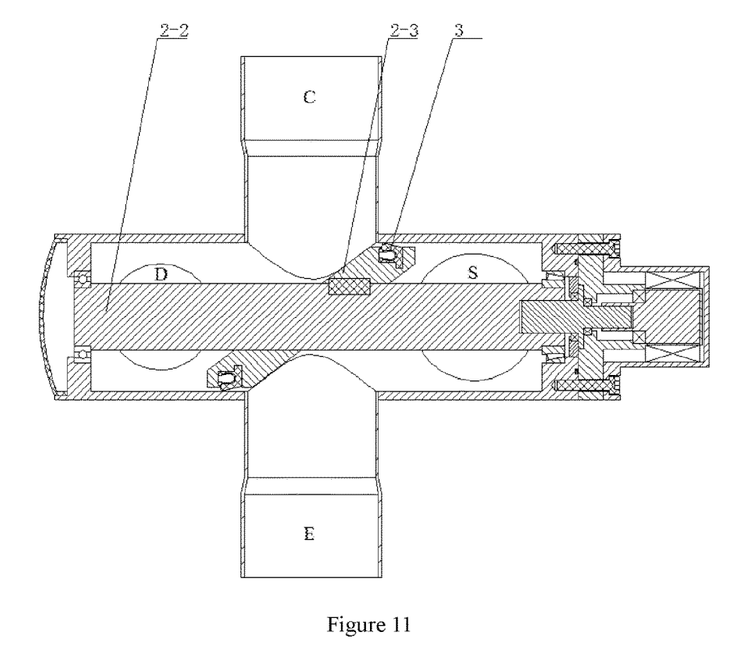
FIG. 11 is a schematic diagram of the rotary four-way reversing valve with low pressure drop and low leakage in example 2.

As shown in FIG. 11, the difference between example 2 and example 1 is as follows: firstly, the valve core assembly 2 comprises a second valve core 2-2, an oblique baffle 2-3 is arranged on the second valve core 2-2, and a seal ring 3-1 is directly arranged on the outer circumference of the oblique baffle 2-3; and secondly, the valve core assembly 2 is driven by a motor drive assembly. Other structures and operating modes of example 2 are the same as example 1.

Example 3

Figure 12:
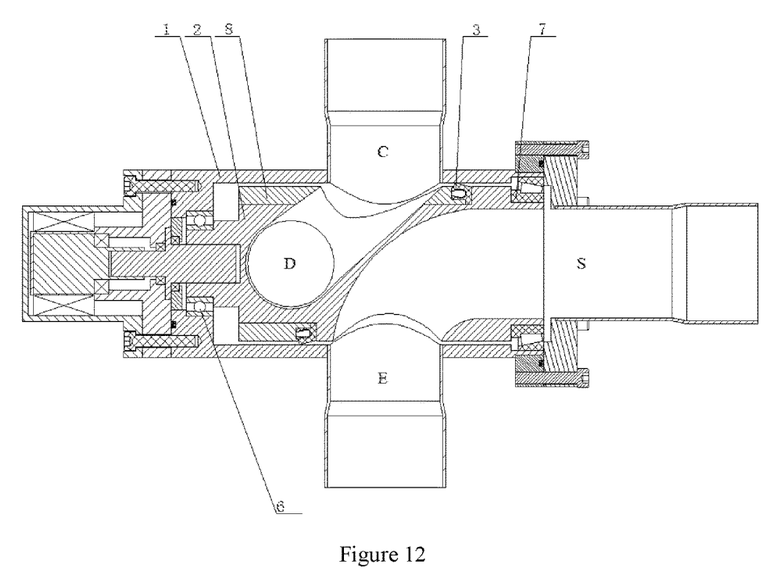
FIG. 12 is a schematic diagram of the rotary four-way reversing valve with low pressure drop and low leakage in example 3.

As shown in FIG. 12, the difference between example 3 and example 1 is that the valve core assembly 2 is driven by the motor drive assembly. Other structures and operating modes of example 3 are the same as example 1.

The invention claimed is:

1. A rotary four-way reversing valve with low pressure drop and low leakage, comprising a valve body (1) and a valve core assembly (2) capable of switching between a first stop position and a second stop position in the valve body (1) by rotation, a high-pressure air inlet tube (D), an evaporating tube (E), a condenser tube (C) and a low-pressure exhaust tube (S) communicated with the valve body (1) through openings arranged on the valve body (1), wherein the valve core assembly (2) is coaxially assembled in the valve body (1) through bearings;

wherein when the valve core assembly (2) is rotated to the first stop position, the high-pressure air inlet tube (D) is communicated with the condenser tube (C) through a first channel, which is slant relative to an axis of the valve core assembly (2), and the evaporating tube (E) is communicated with the low-pressure exhaust tube (S) through a second channel; and wherein when the valve core assembly (2) is rotated to the second stop position, the high-pressure air inlet tube (D) is communicated with the evaporating tube (E) through the first channel (4), and the condenser tube (C) is communicated with the low-pressure exhaust tube (S) through the second channel;

wherein a gap is formed between an outer circumference of the valve core assembly (2) and an inner wall of the valve body (1), a seal structure (3) is slantly arranged on the outer circumference of the valve core assembly (2) relative to the axis of the valve core assembly (2), and an outermost edge of the seal structure (3) is in tight fit with the inner wall of the valve body (1), the gap formed between the valve body (1) and the valve core assembly (2) is divided by the seal structure (3) into a high pressure chamber (4) and a low pressure chamber (5) that are mutually independent, wherein the seal structure (3) is capable of moving with the valve core assembly (2) when the valve core assembly (2) is rotated between the first stop position and the second stop position, the seal structure (3) is slantly arranged on the outer circumference of the valve core assembly (2) relative to the axis of the valve core assembly (2) with a predefine angle such that when the valve core assembly (2) is rotated to either the first stop position or the second stop position, the first channel is always located in the high pressure chamber (4), and the second channel is always located in the low pressure chamber (5).

2. The rotary four-way reversing valve with low pressure drop and low leakage according to claim 1, wherein the valve core assembly (2) comprises a first valve core (2-1); the first valve core (2-1) is provided with a through first opening aligned with the high-pressure air inlet tube (D), a second opening aligned with the condenser tube (C) at the first stop position and aligned with the evaporating tube (E) at the second stop position, a third opening aligned with the evaporating tube (E) at the first stop position and aligned with the condenser tube (C) at the second stop position, and a fourth opening aligned with the low-pressure exhaust tube (S); the through first opening is communicated with the second opening only through the first channel formed in the first valve core (2-1), and the third opening is communicated with the fourth opening only through the second channel formed in the first valve core (2-1); and the first channel and the second channel are independent of each other, and the second channel is an arc-shaped channel bent by 80-100°; or the valve core assembly (2) comprises a second valve core (2-2), a first oblique baffle (2-3) is arranged on the second valve core (2-2), and the seal structure (3) is arranged on the outer circumference of the oblique baffle (2-3).

3. The rotary four-way reversing valve with low pressure drop and low leakage according to claim 1, wherein the valve core assembly (2) is coaxially assembled in the valve body (1) through a first bearing (6) for bearing radial force and a second bearing (7) for bearing radial force and axial force, and the bearings are located at both ends of the valve core assembly (2).

4. The rotary four-way reversing valve with low pressure drop and low leakage according to claim 1, wherein the seal structure (3) comprises a seal ring (3-1) with a seal lip that is tightly sheathed on the valve core assembly (2), the lip opening of the seal ring (3-1) faces toward the high-pressure chamber (4), and the outmost edge of the lip of the seal ring (3-1) is in tight fit with the inner wall of the valve body (1).

5. The rotary four-way reversing valve with low pressure drop and low leakage according to claim 4, wherein the seal ring (3-1) is a U shape with a seal lip and is embedded with a spring (3-2) therein; the spring (3-2) is also a U-shaped toothed spring in fit with the interior of the seal ring (3-1); or the seal ring (3-1) is in an L shape with a seal lip; or the spring (3-2) embedded in the seal ring (3-1) is a spiral cylindrical spring.

6. The rotary four-way reversing valve with low pressure drop and low leakage according to claim 4, wherein the seal ring (3-1) is positioned and fixed on the valve core assembly (2) through a positioning fixture (8).

7. The rotary four-way reversing valve with low pressure drop and low leakage according to claim 6, wherein the positioning fixture (8) has a circle of projection close to the outer edge of the seal ring (3-1) end, and the projection sheathes the seal lip of the seal ring (3-1) to protect the seal ring (3-1) against tearing by high-pressure airflow during reversing.

8. The rotary four-way reversing valve with low pressure drop and low leakage according to claim 4, wherein the seal ring (3-1) is made from Freon-resistant and heat-and-cold-resistant elastic materials.

9. The rotary four-way reversing valve with low pressure drop and low leakage according to claim 1 wherein the valve core assembly (2) is driven by a drive assembly to rotate by about 180°.

10. The rotary four-way reversing valve with low pressure drop and low leakage according to claim 9, wherein the drive assembly is a motor drive assembly (9) that drives the valve core assembly (2) to rotate through a rack and pinion mechanism.

* * * * *